United States Patent [19]
Knudtson

[11] Patent Number: 6,062,975
[45] Date of Patent: May 16, 2000

[54] VENTILATION SYSTEM FOR VEHICLE

[75] Inventor: John E. Knudtson, Granger, Ind.

[73] Assignee: Utilimaster Corporation, Wakarusa, Ind.

[21] Appl. No.: 09/042,165

[22] Filed: Mar. 13, 1998

[51] Int. Cl.$^7$ ..................................................... B60H 1/28
[52] U.S. Cl. .......................... 454/138; 454/112; 454/143; 454/152; 454/158
[58] Field of Search ................................... 454/107, 109, 454/111, 112, 137, 138, 143, 152, 158, 82; 138/172, 173

[56] References Cited

U.S. PATENT DOCUMENTS

| | | |
|---|---|---|
| 181,429 | 8/1876 | Foglesong . |
| 412,913 | 10/1889 | Brown . |
| 1,610,891 | 12/1926 | Schultz . |
| 1,778,591 | 10/1930 | Genett ..................................... 454/138 |
| 1,842,137 | 1/1932 | Williams ................................. 454/138 |
| 2,012,594 | 8/1935 | Walker .................................... 454/138 |
| 2,053,606 | 9/1936 | Flammang ............................... 454/138 |
| 2,172,939 | 9/1939 | Lintern et al. . |
| 2,202,743 | 5/1940 | Miller et al. . |
| 2,398,894 | 4/1946 | Scholfield ............................... 454/138 |
| 2,756,664 | 7/1956 | McCuen .................................. 454/138 |
| 2,758,533 | 8/1956 | Hill et al. ................................ 454/138 |
| 2,775,185 | 12/1956 | Ahrens .................................... 454/138 |
| 2,987,980 | 6/1961 | Winn ....................................... 454/138 |
| 3,211,076 | 10/1965 | Chancellor et al. . |
| 3,295,431 | 1/1967 | Warner .................................... 454/138 |
| 4,006,931 | 2/1977 | Groves . |
| 4,087,125 | 5/1978 | Stephens . |
| 4,122,761 | 10/1978 | Westin et al. . |
| 4,172,494 | 10/1979 | Saulters . |
| 4,953,449 | 9/1990 | Jackson . |

FOREIGN PATENT DOCUMENTS 59-164215  9/1984  Japan ..................................... 454/138

OTHER PUBLICATIONS

Exhibit A is a drawing prepared by the inventor of a Union City body company cargo ventilation system which depicts the system, to the best of the inventor's recollection, viewed by the inventor at a Truck Maintenance Council exposition in Houston, Texas on Oct. 7, 1997.

Exhibits B–1 and B–2 show a Grumman Olson ventilation system which was viewed and photographed by the inventor in Jun. of 1997.

*Primary Examiner*—Harold Joyce
*Attorney, Agent, or Firm*—Barnes & Thornburg

[57] ABSTRACT

A ventilation system for a vehicle to pressurize the cargo area of the vehicle including a duct mounted adjacent the top wall of the vehicle cab with a first end in flow communication with an opening in the front wall of the vehicle, and a second end in flow communication with the cargo area of the vehicle. An adjustable damper is disposed within the duct adjacent the first end. The damper is adjustable between a closed position and an opened position to adjust the amount of air flow through the duct. The center portion of the duct includes a plurality of apertures to direct a portion of the air flowing through the duct into the cab. The lower wall of the center portion includes a plurality of diagonal channels to collect water and direct it to a drain adjacent the first end of the duct. A fan is mounted within the duct to provide air flow into the cargo area when the vehicle is not moving. A filter is also mounted within the duct to prevent dust and particulate matter from entering the cargo area.

34 Claims, 6 Drawing Sheets

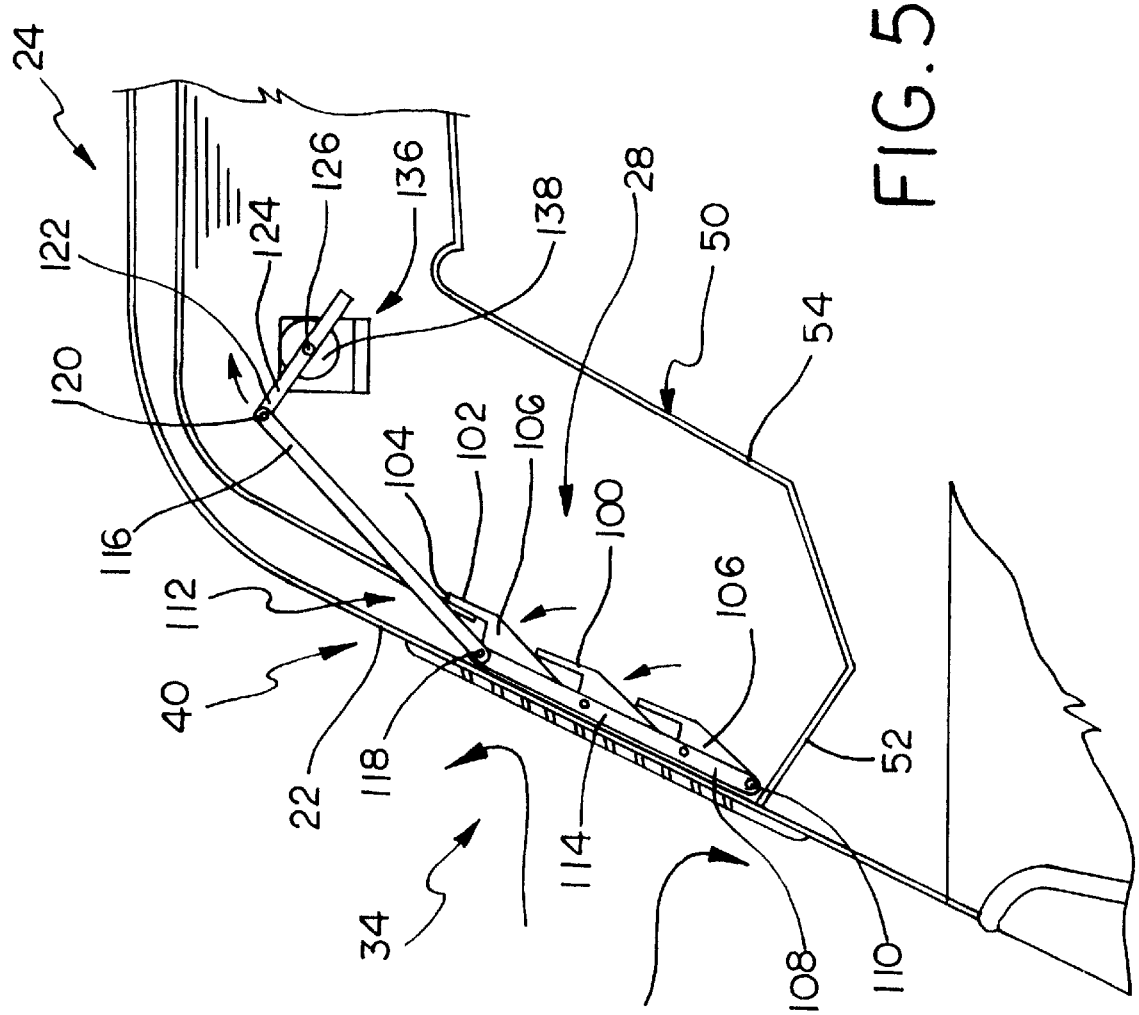

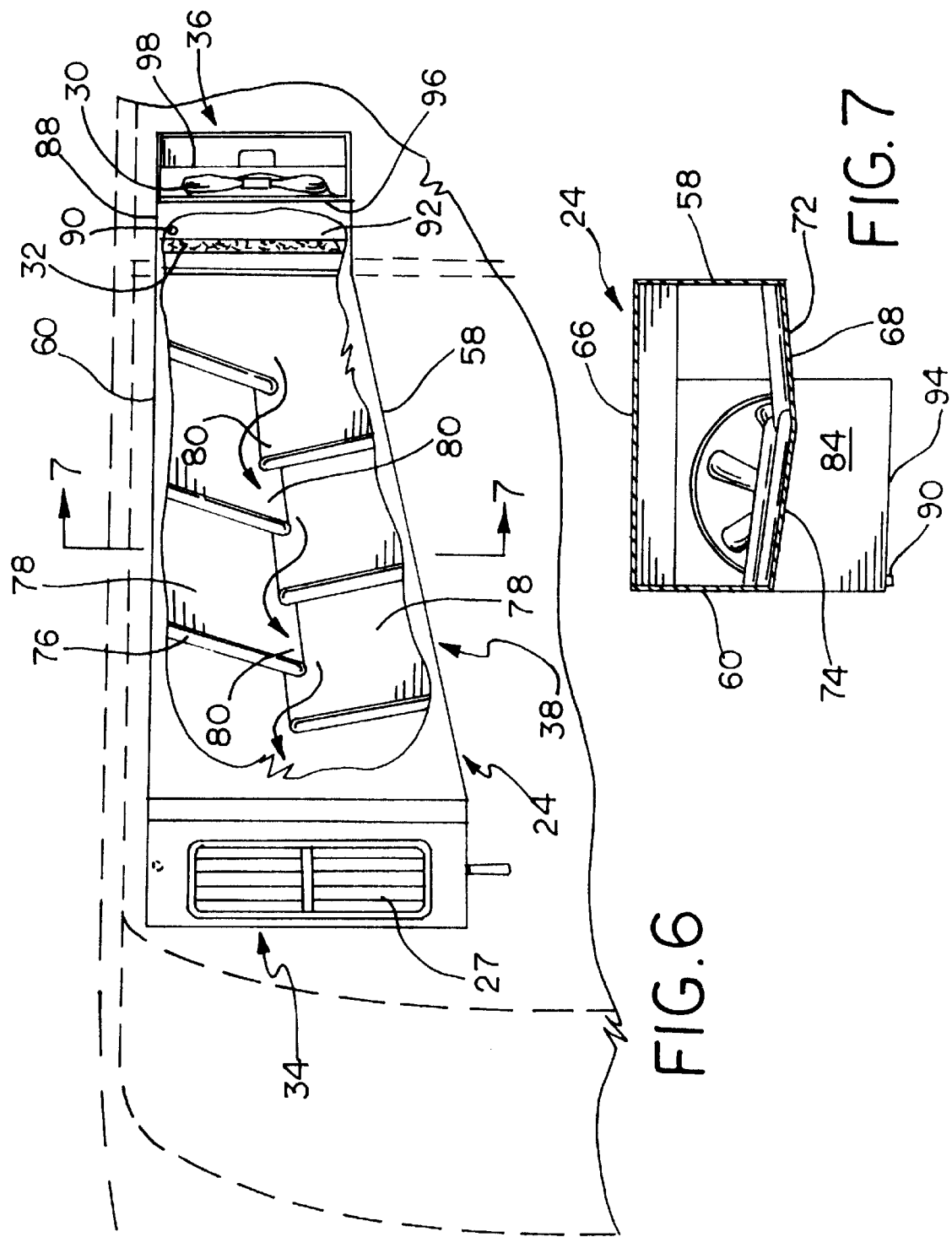

VENTILATION SYSTEM FOR VEHICLE

BACKGROUND OF THE INVENTION

The present invention relates generally to ventilation systems for motor vehicles, and more particularly to a ventilation system which provides positive pressurization to the cargo area of a vehicle.

It is desirable to preserve the cleanliness of cargo carried within the cargo area of a vehicle during transport. Cargo carrying vehicles frequently travel across dusty or otherwise dirty roads. During travel, it is common for the cargo areas to ingest dust and other particulate matter, especially through cracks and openings around access doors. As it is difficult to adequately seal such cargo areas to prevent air infiltration, it is desirable to provide pressurization to the interior of the cargo area so that the interior pressure exceeds the exterior pressure, thereby preventing infiltration of contaminated exterior air.

The present invention provides a ventilation system including a duct mounted within the vehicle cab adjacent the top wall of the cab. The duct has a first end in flow communication with an opening in the forwardly facing front wall of the vehicle cab, and a second end in flow communication with the cargo area of the vehicle. The body of the duct has a low profile to maximize the interior head room of the cab. An adjustable damper is mounted within the first end of the duct across the opening in the vehicle front wall to provide control over the amount of air passing through the duct. A low profile center portion of the duct has a lower wall which inclines or slants upwardly toward the top wall of the cab with distance from the first end. Channels formed into the lower wall are arranged to collect moisture and direct the moisture downwardly toward the first end where a drain empties the duct to the exterior of the vehicle. The side walls of the low profile center portion of the duct also include a plurality of apertures with adjustable dampers to permit a portion of the air passing through the duct to communicate into the interior of the cab. The second end of the duct includes an angled portion disposed adjacent the bulkhead panel which separates the cab from the cargo area. The second angled portion slants downwardly away from the top wall with distance from the first end, and extends through an opening in the bulkhead panel into the cargo area of the vehicle. The portion extending into the cargo area forms a box-like opening. A removable filter for collecting particulate matter and moisture is situated within the duct adjacent the box-like opening to prevent these contaminants from entering the cargo area.

In one embodiment of the present invention, a fan is mounted within the duct adjacent the box-like opening. The fan directs air into the cargo area during periods of operation when the forward motion of the vehicle does not force air into the cargo area, such as when the vehicle is stopped.

In another embodiment of the invention, a power actuator is connected to the adjustable damper to provide push button air flow adjustment.

Other features of the present invention will become apparent upon consideration of the following description of exemplary embodiments and the accompanying drawings.

BRIEF DESCRIPTION OF THE DRAWINGS

FIG. 5 is a side elevational view similar to FIG. 4 with a portion cut-away.

FIG. 6 is a top plan view of the ventilation system shown in FIGS. 1 and 2 with a portion cut-away.

FIG. 7 is a cross-sectional view taken substantially along line 7—7 of FIG. 6.

DESCRIPTION OF EMBODIMENTS OF THE INVENTION

The embodiments described herein are not intended to be exhaustive or to limit the invention to the precise forms disclosed. Rather, the embodiments selected for description are disclosed so that others skilled in the art may utilize their teachings.

Figure 1:
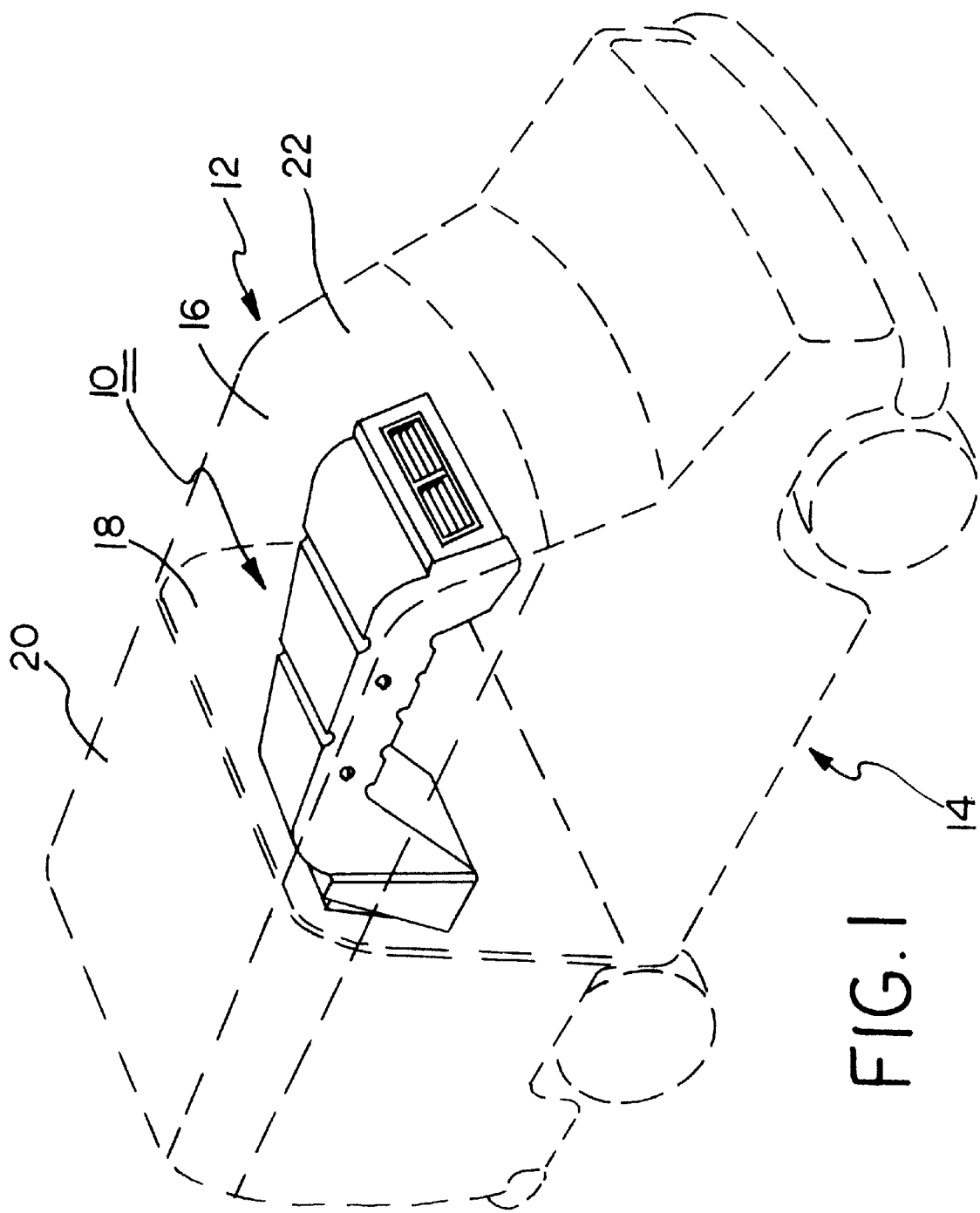
FIG. 1 is a perspective view of a ventilation system according to the present invention mounted within the cab of a vehicle.

FIG. 1 shows the ventilation system of the present invention, generally designed 10, mounted within the interior of the cab 12 of a cargo carrying vehicle 14 shown in phantom. Cab 12 includes a top wall 16, a bulkhead panel 18 separating cab 12 from the cargo area 20, and a forward facing front wall 22. As shown in the figure, the system of the present invention is mounted between front wall 22 and bulkhead panel 18, substantially conforming to the contours of the upper section of cab 12. In an exemplary embodiment, system 10 is installed as a retrofit or after market option. As such, the dimensions of system 10 are designed to conform to the interior contours of various vehicles 14.

Figure 2:
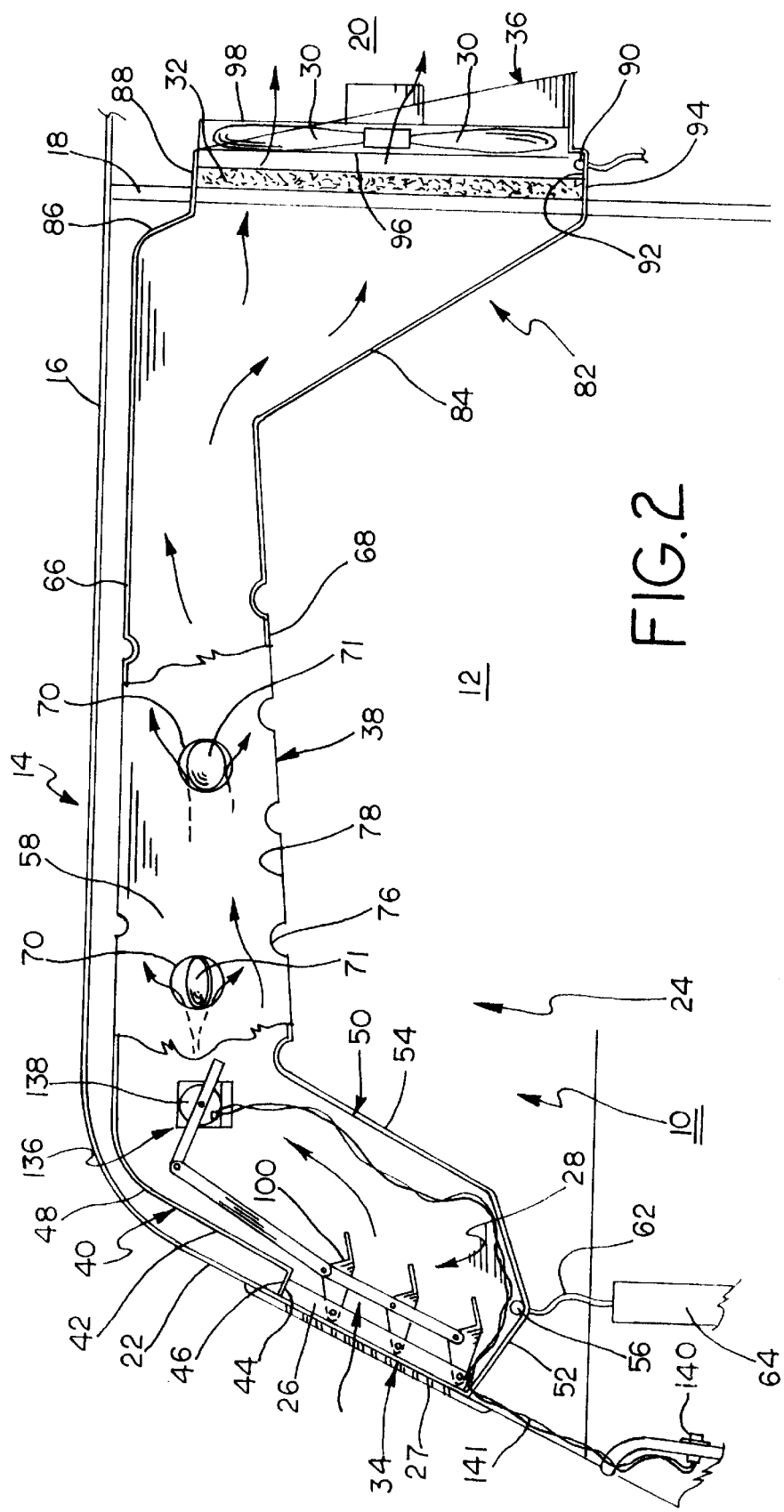
FIG. 2 is a side elevational view of the system of FIG. 1 with a portion cut-away.
Figure 3:
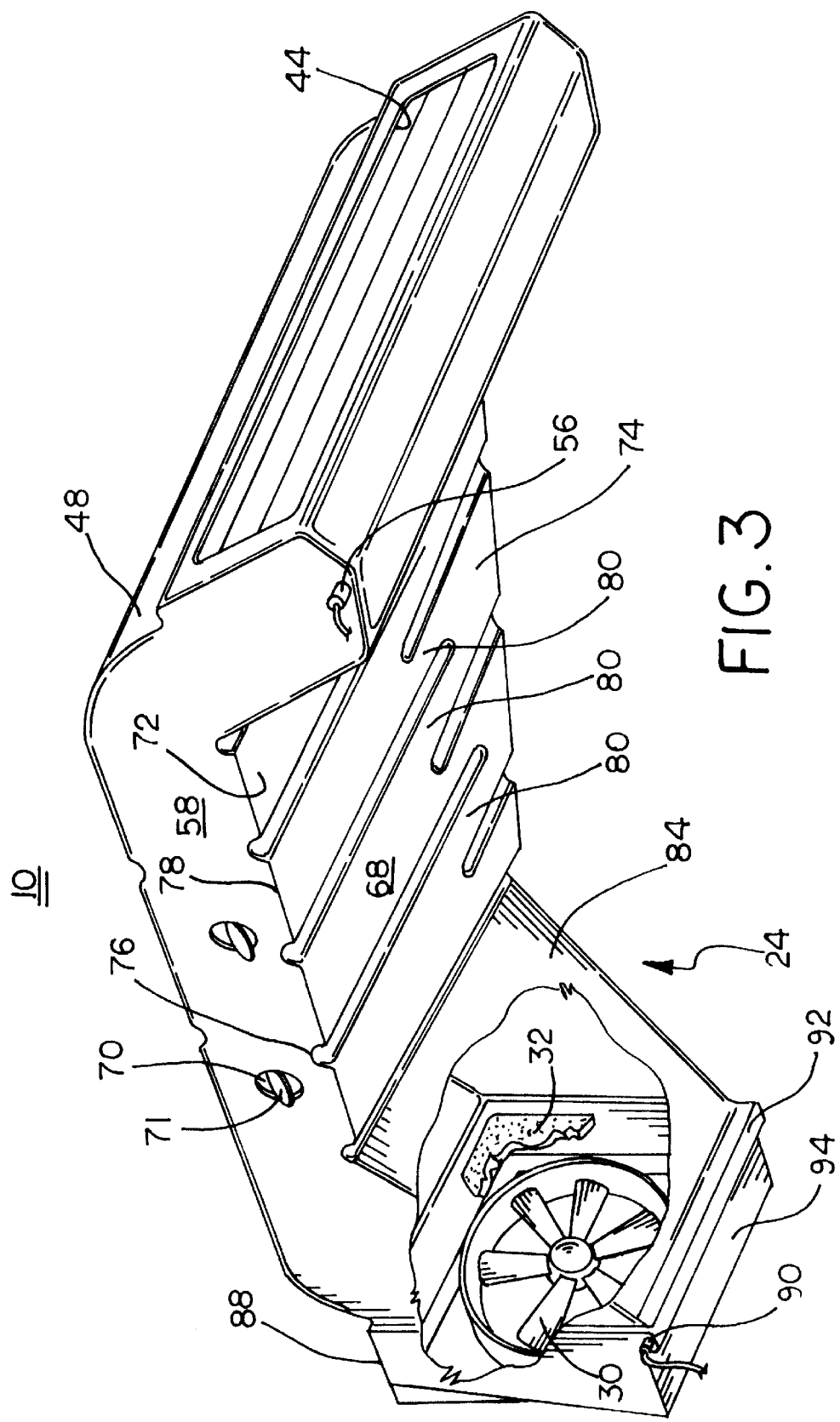
FIG. 3 is a perspective view of the ventilation system shown in FIGS. 1 and 2 with a portion cut-away.

Referring now to FIG. 2, system 10 generally includes a unitary or one piece duct 24 made of plastic or some other strong, relatively lightweight material. Duct 24 includes a pair of side walls 58, 60 and a plurality of upper and lower walls which together form a passageway through which air is directed from the opening 26 in front wall 22 of the vehicle 14, which is covered by grill 27 (see FIG. 6), to cargo area 20. System 10 also includes an adjustable damper assembly 28 for controlling the amount of air flow through duct 24, a fan 30 for generating air flow when vehicle 14 is not moving, and a filter 32 for filtering contaminants and moisture from the air flowing into cargo area 20.

Duct 24 generally includes a first end 34, a second end 36, and a body or center portion 38. First end 34 includes a first angled portion 40 disposed adjacent front wall 22 of vehicle 14. First angled portion 40 has an interior wall 50 and a forward wall 42 which is angled rearwardly so as to match the angle of vehicle front wall 22. Forward wall 42 defines a substantially rectangular opening 44 which, when duct 24 is mounted within cab 12, aligns with opening 26 through front wall 22 of vehicle 14. Forward wall 42 includes a shelf 46 which extends perpendicularly backwardly from forward wall 42 toward the interior of cab 12 to provide clearance from obstructions on front wall 22. Wall 42 also includes an upper segment 48 which extends from shelf 46 toward top wall 16 of cab 12.

The rearward interior wall 50 of first angled portion 40 consists of two wall sections. The first wall section 52 extends from forward wall 42 toward the interior of the cab at a slightly inclined angle relative to horizonal. The second wall section 54 extends upwardly toward top wall 16 in substantially parallel relationship to forward wall 42 forming a valley with a V-shaped cross-section with first wall section 52.

A drain 56 or opening is disposed at the lowermost corner of first angled portion 40 through side wall 60. A tube 62 connects drain 56 to a channel or passageway (not shown) through the side frame 64 of vehicle 14 for draining moisture collected during operation as described in greater detail below.

Center portion 38 is also bounded by side walls 58, 60, and includes an upper wall 66 and a lower wall 68. Upper wall 66 of center portion 38 is mounted adjacent top wall 16 of cab 12 in substantially parallel relationship thereto. Upper wall 66 is spaced apart from top wall 16 to provide clearance for installation in cabs having various interior dimensions. To maximize the size of opening 44 at first end 34, duct 24 widens from second end 36 to first end 34, as best shown in FIG. 6.

In one embodiment of the invention, side walls 58, 60 of duct 24 include apertures 70 which house adjustable dampers 71 to permit a portion of the air flowing through the duct to enter the interior of the cab 12 to provide ventilation. Lower wall 68 of center portion 38 slants upwardly with distance from first end 34, as best shown in FIG. 2. Lower wall 68 also slants in a V-shaped fashion from each side wall 58, 60 toward the centerline of lower wall 68 (see FIG. 7). As such, lower wall 68 is essentially divided into two portions 72, 74. Portion 72 slants from side wall 58 downwardly toward the center of lower wall 68, and portion 74 slants from side wall 60 downwardly toward the center of lower wall 68. Each portion 72, 74 of lower wall 68 includes a plurality of ridges 76 which define between them a plurality of channels 78. As best shown in FIG. 6, channels 78 are diagonal relative to the length of center portion 38, and alternate from one side of lower wall 68 to the other. The lowermost portion 80 of each channel 78 extends partially into the opposing channel to direct the flow of moisture collected by ridges 76 over a tortuous path as indicated by the arrows of FIG. 6.

Referring again to FIG. 2, a second angled portion 82 of the duct has an interior wall 84 which slants downwardly away from top wall 16 of cab 12 with distance from first end 34. A small, upper wall 86 of second angled portion 82 similarly angles downwardly to avoid obstructions adjacent the top of wall 18. Interior wall 84, upper wall 86, and side walls 58, 60 of second angled portion 82 converge at bulkhead panel 18 to pass through a substantially rectangular opening (not shown) in bulkhead panel 18. A box-like portion 88 of second angled portion 82 extends into cargo area 20 and opens into cargo area 20 at second end 36 of duct 24. Removable filter 32 is disposed within box-like portion 88. Filter 32 is a conventional moisture and particulate filter, and is mounted within box-like portion 88 in a standard fashion. Filter 32 is inserted and removed either through the opening at second end 36 of box-like portion 88 or through a slot in the box-like portion transverse to the opening (not shown). A drain 90 or opening is disposed within a well 92 formed in the lower wall 94 of box-like portion 88.

The fan 30 is positioned within the second angled portion 82 in box-like portion 88 or, alternatively, on the cab side of bulkhead panel 18. Fan 30 has an intake side 96 and an exhaust side 98. Fan 30 is mounted within duct 24 in a standard fashion so as to draw air through opening 26 in front wall 22 of vehicle 14 and force the air into cargo area 20 through second end 36 of duct 24.

Figure 4:
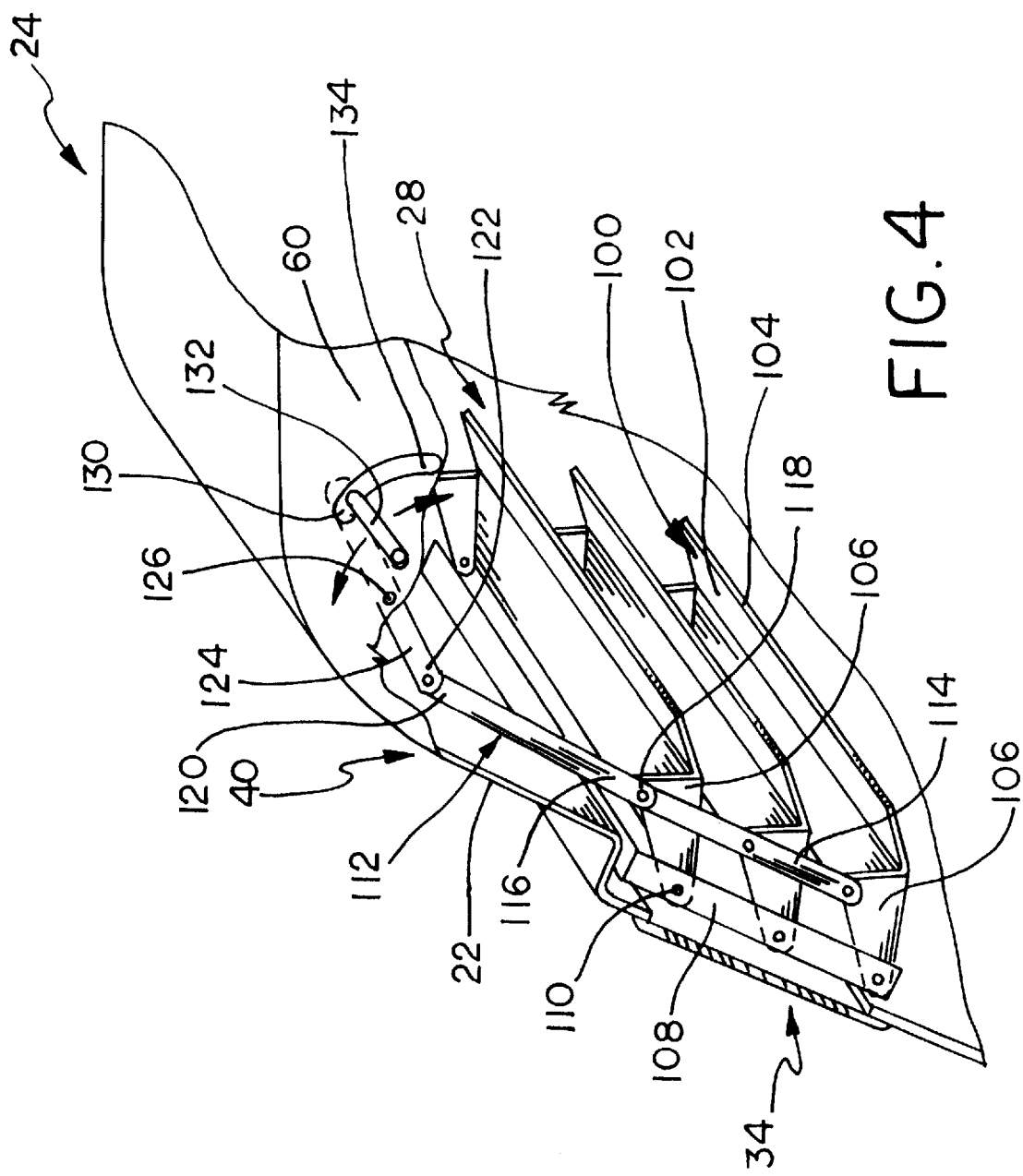
FIG. 4 is a perspective view, partly in section, showing an adjustable damper according to the present invention with a portion cut-away.

Referring now to FIG. 4, the adjustable damper assembly 28 of the present invention is mounted within first angled portion 40 of duct 24 adjacent first end 34. Damper assembly 28 includes a plurality of elongated, flat, damper blades 100.

Each blade 100 has an upturned portion 102 along its trailing edge 104 and a perpendicular pivot wall 106 at each end. Blades 100 are mounted in parallel relationship between a pair of rails 108. Each pivot wall 106 is mounted to one of the rails 108 for pivotal movement about a pivot point 110. An armature 112 of damper assembly 28 includes a connector arm 114 which is movably attached to one of the pivot walls 106 of each blade 100 to cause the blades 100 to move in unison. A drive arm 116 is pivotally attached at end 118 to pivot wall 106 of the uppermost blade 100. End 118 of drive arm 116 and connector arm 114 share a common connection to pivot wall 106 of the uppermost blade 100. Drive arm 116 is connected at end 120 to end 122 of the pivot arm 124 of linkage assembly 28. Pivot arm 124 is pivotally attached at a center point 126 to a pivot rod (not shown) extending from side wall 60 of first angled portion 40. End 130 of pivot arm 124 carries an adjustment lever 132 which extends through an arcuate slot 134 formed in side wall 60. Lever arm 132 and arcuate slot 134 are accessible from the interior of cab 12 for adjustment by the operator.

In an alternate embodiment of the invention, a power actuator 136 is connected to pivot arm 124 at pivot point 126, as shown in FIGS. 2 and 5. A conventional motor 138 connected to a switch 140 by wires 141 moves pivot arm 124 to adjust the position of damper blades 100 between an opened and a closed position, as described in greater detail below.

In operation, damper assembly 28 is adjusted from a closed position (as shown in FIG. 5) to an opened position (as shown in FIGS. 2 and 4) before vehicle 14 begins moving. The operator moves lever 132 upwardly through the arcuate slot 134, thereby pivoting pivot arm 124 about its center point 126 and causing drive arm 116 of damper armature 112 to move downwardly. As drive arm 116 moves downwardly, connector arm 114 moves damper blades 100 simultaneously from a closed position wherein the blades are overlapping and substantially parallel to front wall 22 of vehicle 14, to an opened position wherein the blades are pivoted to an angle relative to front wall 22 of the vehicle 14. If power actuator 136 is installed, the operator simply depresses switch 140 to enable motor 138 to pivot pivot arm 124 automatically. Switch 140 is mounted remotely in the dash, or instrument panel, so as to be accessible by the driver in the seated position.

Referring now to FIG. 2, as vehicle 14 moves forward, air enters through opening 26 in front wall 22. Grill 27 across opening 26 prevents ingestion of relatively large objects or debris. The air passes through rectangular opening 44 of duct 24 and across damper blades 100 into first angled portion 40. Damper blades 100 direct air passing through opening 44 toward interior wall 50 of first angled portion 40. The blades 100 are designed so as to prevent a direct path for water from front opening 26 to center portion 38 of the duct. Moisture, such as rain, contacts second wall section 54 of interior wall 50 and flows downwardly across second wall section 54 and first wall section 52 to drain 56. The moisture passes through drain 56 and is transported by tube 62 to the passageway through side frame 64 of vehicle 14. The moisture is expelled from vehicle 14 through an opening at the end of the passageway, for example, in the wheel well of the vehicle (not shown).

The air flows out of first angled portion 40 and into center portion 38 of duct 24. Some of the air flows into the interior of cab 12 through apertures 70 formed in side walls 58, 60 if apertures 70 are opened. Apertures 70 house adjustable dampers 71 to permit an adjustable amount of air flow into cab 12. As the air flows across lower wall 68 of center portion 38, moisture in the air collects on ridges 76 formed between channels 78 in lower wall 68. The moisture flows into channels 78 which guide the moisture toward the centerline of lower wall 68. Moisture is passed from one channel to the next across overlapping, lowermost portions 80 of the channels as best shown in FIG. 6. The moisture travels along the tortuous path indicated by the arrows in FIG. 6 toward first angled portion 40. The overlapping ridges 76 ensure that the incoming air, which would tend to force water up the slant of lower wall 68 toward second angled portion 82, is deflected over the flow of water. This moisture eventually flows down interior wall 54 of first angled portion 40 and is drained from duct 24 as described above.

The air passes through fan 30 mounted in second angled portion 82 and into cargo area 20 through bulkhead panel 18. Dust and other particulate matter is filtered from the air as the air passes through filter 32. Any residual moisture in the air is also prevented from entering cargo area 20 by the filter 32. The moisture collects in well 92 of lower wall 94 and is periodically drained manually or otherwise through drain 90. Finally, the air passes through second end 36 of the duct 24 to provide positive pressurization to cargo area 20. When vehicle 14 stops, for example, at a stop light, fan 30 maintains the positive pressurization in cargo area 20 by continuing to force air through the duct and into the cargo area.

While this invention has been described as having exemplary embodiments, this application is intended to cover any variations, uses, or adaptions using its general principles. Further, this application is intended to cover such departures from the present disclosure as come within the known or customary practice within the art to which it pertains. The spirit and scope of the invention are to be limited only by the terms of the appended claims.

What is claimed is:

1. A ventilation system for a vehicle having a cargo area and a cab, the cargo area being separated from the cab by a panel, the system comprising:
    a duct disposed within the cab having a first end in flow communication with an opening in a wall of the cab,
    a second end in flow communication with an opening through the panel into the cargo area, and
    a body extending therebetween;
    the duct further including a lower wall having a plurality of integral channels formed therein to prevent moisture from entering the cargo area; and
    a damper disposed within the duct being adjustable between a closed position and an open position, wherein the damper permits airflow through the duct.

2. The ventilation system of claim 1 wherein the cab includes a top wall, the duct being adjacent the top wall.

3. The ventilation system of claim 1 wherein the cab includes a front wall, the opening being formed in the front wall.

4. The ventilation system of claim 1 further comprising a grill adjacent the first end of the duct.

5. The ventilation system of claim 1 wherein the damper extends across the first end of the duct.

6. The ventilation system of claim 1 wherein the duct includes at least one aperture communicating the interior of the duct with the cab.

7. The ventilation system of claim 1 further comprising a filter extending substantially across a cross-sectional area of the duct.

8. The ventilation system of claim 1 further comprising a fan mounted in flow communication with the duct.

9. The ventilation system of claim 1 further comprising a power actuator connected to the damper for adjusting the damper between the opened and closed positions, the power actuator including a switch and a motor.

10. The ventilation system of claim 1 wherein the damper includes at least two substantially parallel blades, each of the blades being rotatable about an axis, and an armature connected to the blades.

11. The ventilation system of claim 1 wherein the duct includes a first drain adjacent the first end.

12. The ventilation system of claim 11 wherein the duct includes a second drain adjacent the second end.

13. The ventilation system of claim 1 wherein the cab includes a top wall, the duct body including a first angled portion which slants toward the top wall with distance from the first end, a second angled portion which slants away from the top wall with distance from the first end, and a center portion extending adjacent the top wall between the first and second angled portions.

14. The ventilation system of claim 13 wherein a lower wall including a plurality of integral channels defines the bottom of the center portion of the duct, the lower wall being slanted toward the top wall of the cab with distance from the first end, the channels extending diagonally partially across the lower wall.

15. The ventilation system of claim 13 wherein the first angled portion includes an interior wall which is opposed to and extends from below the damper to above the damper, the damper directing airflow toward the interior wall.

16. The ventilation system of claim 13 wherein the second end of the duct extends into the cargo area.

17. A ventilation system for a vehicle having a cargo area and a cab, the cargo area being separated from the cab by a panel, the system comprising:
    a duct disposed within the cab having a first end in flow communication with an opening in a wall of the cab, a second end in flow communication with an opening through the panel into the cargo area, and a lower wall which slants relative to horizontal between the first and second ends, the lower wall including a plurality of channels formed therein to prevent moisture from entering the cargo area.

18. The ventilation system of claim 17 wherein the cab includes a top wall, the duct being disposed adjacent the top wall.

19. The ventilation system of claim 17 further comprising a damper mounted adjacent the first end being adjustable between a closed position and an opened position wherein the damper permits airflow through the duct.

20. The ventilation system of claim 17 wherein the cab includes a front wall, the opening being formed into the front wall.

21. The ventilation system of claim 19 wherein the damper extends across the first end of the duct.

22. The ventilation system of claim 19 wherein the damper is mounted within the duct.

23. The ventilation system of claim 17 wherein the duct includes at least one aperture communicating the interior of the duct with the cab.

24. The ventilation system of claim 17 further comprising a filter extending substantially across a cross-sectional area of the duct.

25. The ventilation system of claim 17 further comprising a fan mounted in flow communication with the duct.

26. The ventilation system of claim 19 further comprising a power actuator connected to the damper for adjusting the damper between the opened and closed positions, the power actuator including a switch and a motor.

27. The ventilation system of claim 17 wherein the channels extend diagonally partially across the lower wall.

28. The ventilation system of claim 18 wherein the duct body includes a first angled portion which slants toward the top wall with distance from the first end, a second angled portion which slants away from the top wall with distance from the first end, and a center portion extending adjacent the top wall between the first and second angled portions.

29. A ventilation system for a vehicle having a cargo area and a cab, the cargo area being separated from the cab by a panel, the system comprising:

a duct disposed within the cab having a pair of side walls, a first end in flow communication with an opening in a wall of the cab, and a second end in flow communication with an opening through the panel into the cargo area, the duct having a lower wall including a plurality of channels, one quantity of channels being substantially parallel to one another, extending from one of the side walls partially across the lower wall toward a center line of the lower wall, another quantity of channels being substantially parallel to one another, extending from the other side wall partially across the lower wall toward the centerline of the lower wall.

30. The ventilation system of claim 29 wherein a portion of the lower wall slants downwardly from the second end to the first end of the duct.

31. The ventilation system of claim 29 wherein the centerline is spaced substantially equally between the side walls.

32. The ventilation system of claim 29 wherein the channels extend across the centerline.

33. The ventilation system of claim 29 wherein the channels extend partially toward the first end of the duct.

34. The ventilation system of claim 29 wherein each of a plurality of channels from the one quantity of channels extends partially between two channels from the other quantity of channels.

* * * * *